Figure 8:
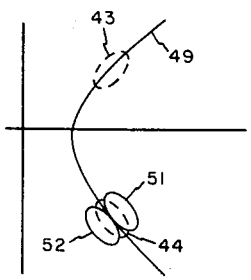

Feb. 15, 1966 R. A. FLOWER ETAL 3,235,865
CALIBRATION CORRECTING SYSTEM FOR DOPPLER NAVIGATORS
Filed Feb. 14, 1964 5 Sheets-Sheet 1
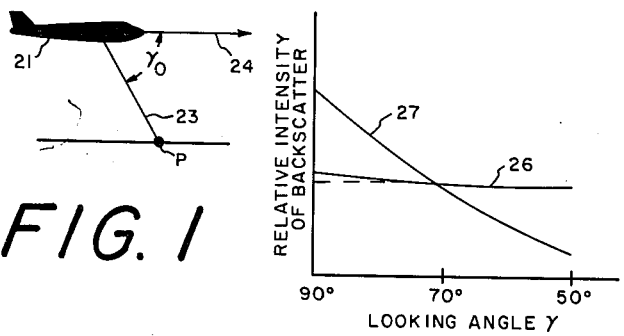
FIG. 1
FIG. 2
FIG. 3
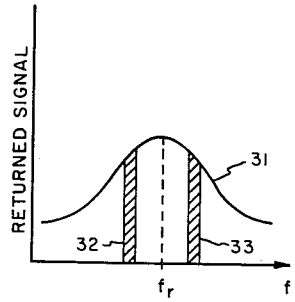
FIG. 4
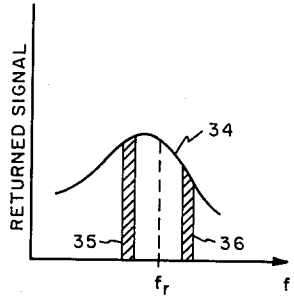
FIG. 5
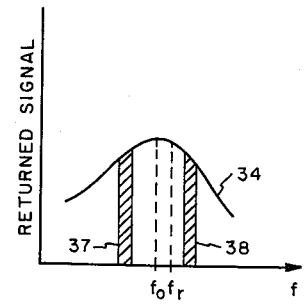
FIG. 6
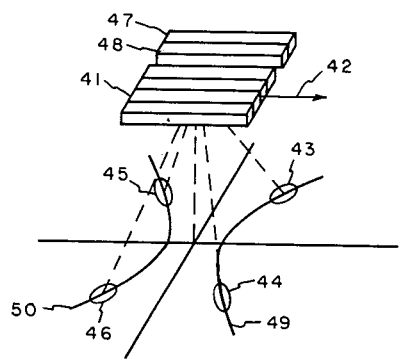
FIG. 7
INVENTOR.
ROBERT A. FLOWER
GEORGE R. GAMERTSFELDER
JOHN C. ROLFS
BY DONALD J. TOMAN
ATTORNEY.

Feb. 15, 1966　　　R. A. FLOWER ETAL　　　3,235,865
CALIBRATION CORRECTING SYSTEM FOR DOPPLER NAVIGATORS
Filed Feb. 14, 1964　　　　　　　　　　　　　5 Sheets-Sheet 2

INVENTOR.
ROBERT A. FLOWER
GEORGE R. GAMERTSFELDER
BY JOHN C. ROLFS
DONALD J. TOMAN

ATTORNEY.

INVENTOR.
ROBERT A. FLOWER
GEORGE R. GAMERTSFELDER
JOHN C. ROLFS
DONALD J. TOMAN
BY
ATTORNEY.

INVENTOR.
ROBERT A. FLOWER
GEORGE R. GAMERTSFELDER
JOHN C. ROLFS
DONALD J. TOMAN

ATTORNEY.

INVENTOR.
ROBERT A. FLOWER
GEORGE R. GAMERTSFELDER
JOHN C. ROLFS
DONALD J. TOMAN
BY
ATTORNEY.

United States Patent Office 3,235,865
Patented Feb. 15, 1966

3,235,865
CALIBRATION CORRECTING SYSTEM FOR DOPPLER NAVIGATORS
Robert A. Flower, White Plains, and George R. Gamertsfelder, John C. Rolfs, and Donald J. Toman, Pleasantville, N.Y., assignors to General Precision, Inc., a corporation of Delaware
Filed Feb. 14, 1964, Ser. No. 344,927
9 Claims. (Cl. 343—8)

This invention relates generally to airborne Doppler radar navigation equipment and particularly to a system for automatically adjusting the calibration of such equipment to compensate for the different reflectivity characteristics of the terrain over which the aircraft is passing.

A Doppler radar navigation system usually operates by transmitting two or more beams of microwave energy inclined toward the ground. A portion of the energy is received after backscattering from the ground and, from the change in frequency caused by the relative motion of the aircraft and ground, a signal is generated proportional to the velocity of the aircraft.

A study of the scattering properties of various portions of the surface of the earth has shown that for irregular ground (the condition usually encountered), scattering is very nearly isotropic, that is, equal amounts of power are scattered in all directions. However, the scattering from large bodies of water, such as the sea, is far from isotropic, tending more toward specular reflection. These properties vary with the angle of incidence and also with sea state, or roughness. The scattering properties of land and sea have been discussed extensively in the literature, for example in U.S. Patents Nos. 3,023,407, 3,044,059 and 3,077,594, which patents deal with the effects of scattering properties on navigation equipment. As will be more fully discussed herein, a Doppler navigation system properly calibrated for over land operation indicates a different velocity when the aircraft flies at the same speed over the sea.

A number of attempts have been made in the past to overcome or compensate for the change in calibration constant as an aircraft flies over different kinds of terrain. However, none of the prior devices have been entirely satisfactory. Some have required complex beam transmission patterns, some have upset the normal operation of the system, while others have provided only a fixed or average change in calibration constant regardless of the magnitude of change actually required. Typical of the latter kind is the "land-sea" switch often provided.

It is a general object of the present invention to provide an improved system for compensating for the various scattering properties of different kinds of terrain over which a Doppler navigation equipped aircraft may fly.

Another object is to provide a calibration correction system which does not affect normal operation adversely.

Another object is to provide a calibration correction system in which the magnitude of the correction applied is in accordance with the nonuniformity of the scattering properties of the terrain encountered.

A subsidiary object is to provide apparatus for determining the amount of nonuniformity of the backscattering properties of the surface beneath an aircraft.

Briefly stated, the invention comprises two auxiliary antennas for receiving backscattered energy. One antenna receives energy at an angle slightly less and the other receives at an angle slightly greater than that of the regular antenna. The amount of power received by the two auxiliary antennas is compared and any difference is used to generate a calibration correcting signal.

Figure 9:
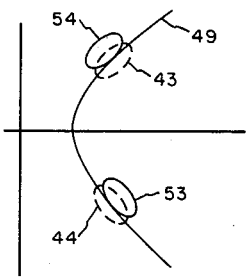
Figure 10:
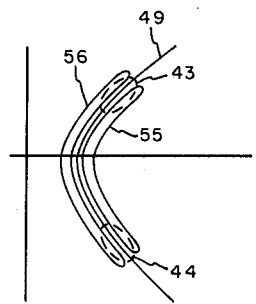
Figure 17:
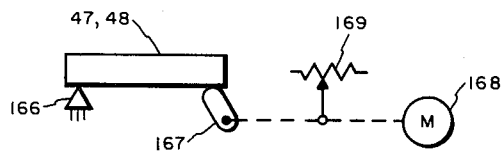
Figure 18:
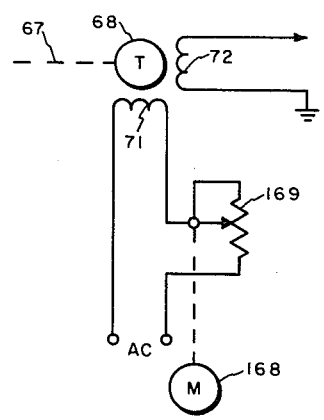
Figure 11:
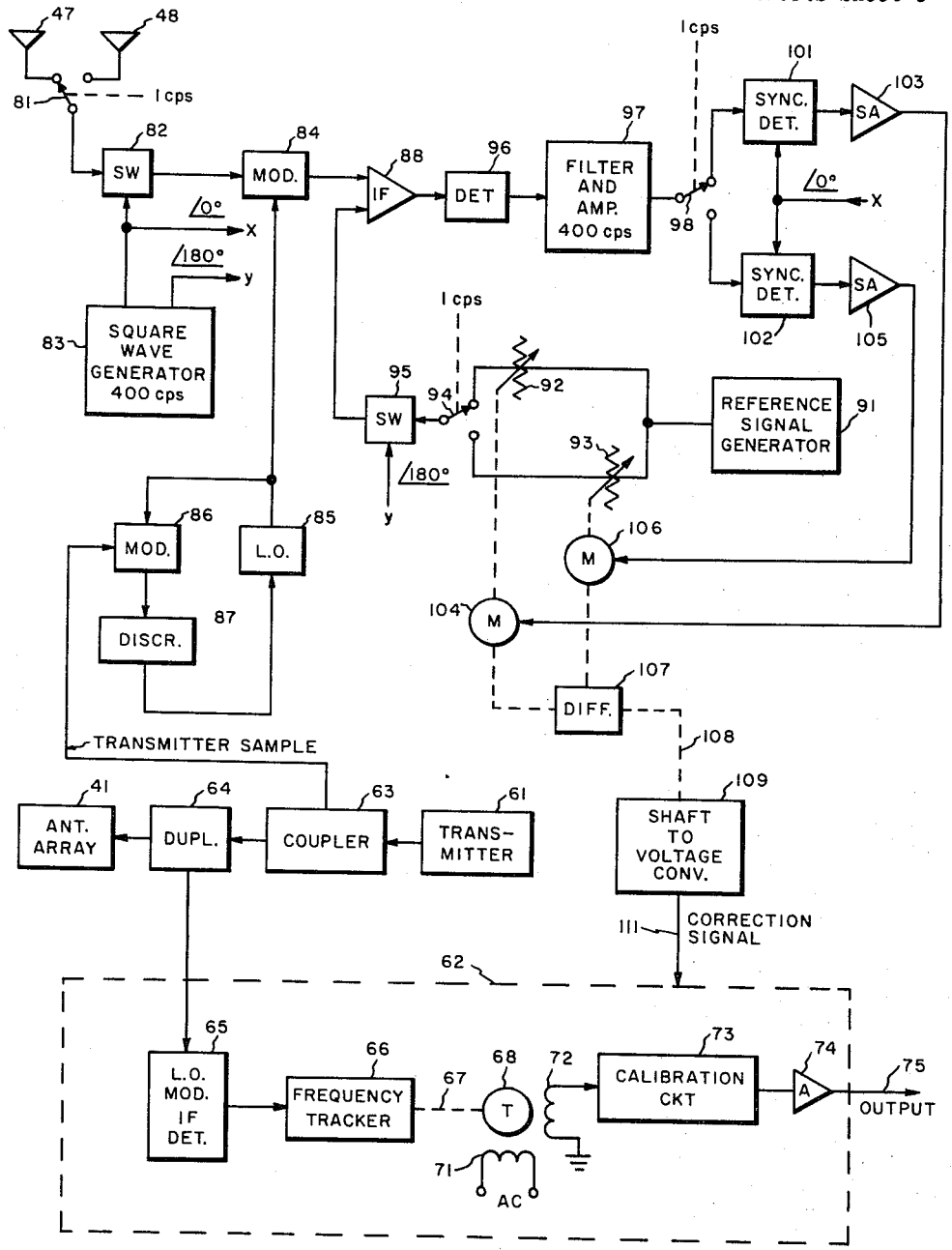
Figure 12:
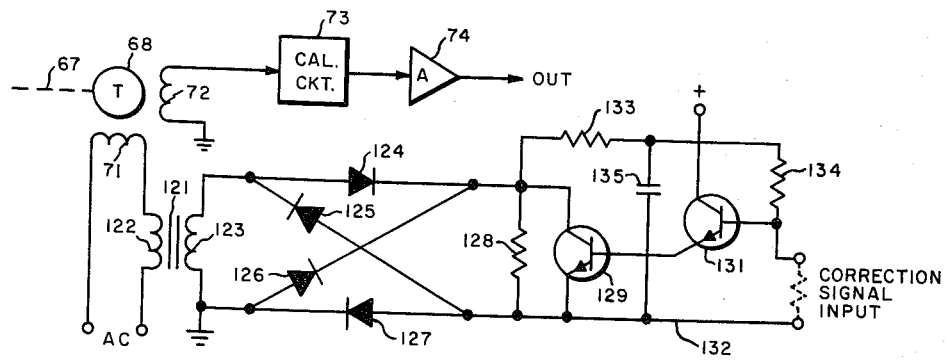
Figure 13:
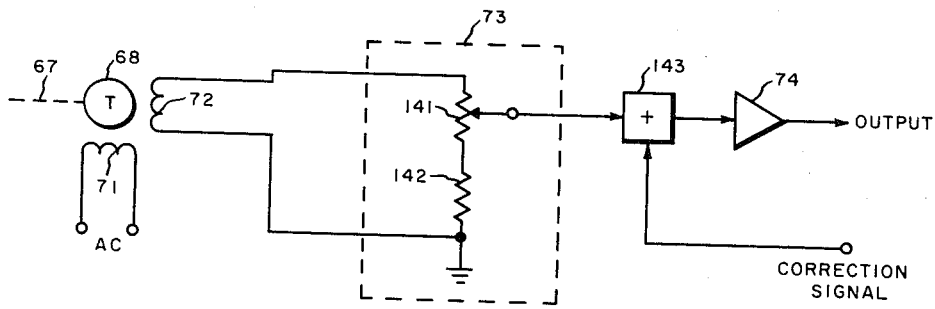
Figure 14:
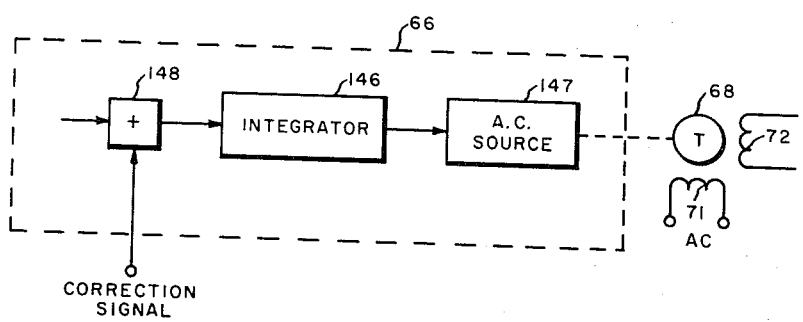
Figure 15:
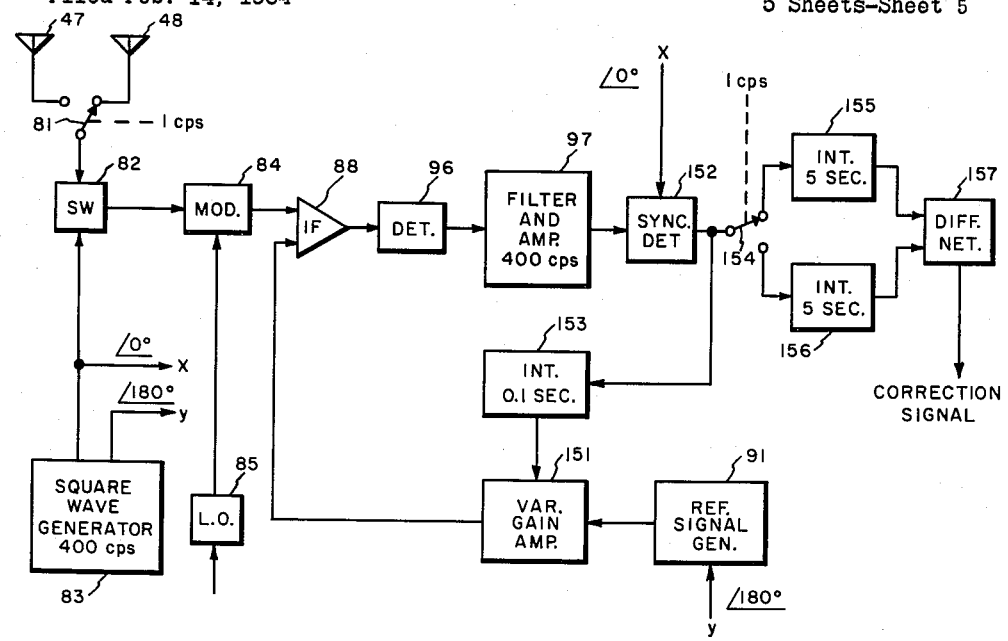
Figure 16:
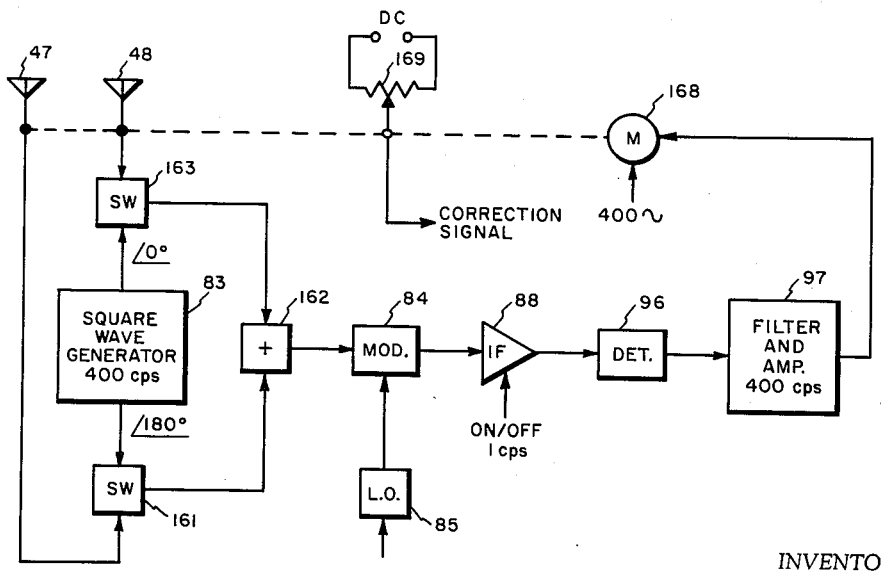

For a clearer understanding of the invention, reference may be made to the following detailed description and the accompanying drawing, in which:

FIGURES 1 and 3 are schematic diagrams illustrating one beam of a navigation system;
FIGURES 2, 4, 5 and 6 are graphs useful in explaining the invention;
FIGURE 7 is a schematic diagram of the antennas of a navigation system including the invention;
FIGURES 8, 9 and 10 are schematic diagrams illustrating various antenna patterns;
FIGURE 11 is a schematic diagram of one embodiment of the invention;
FIGURES 12, 13 and 14 are schematic diagrams showing various ways of applying the correction signal to the navigation system;
FIGURE 15 is a schematic diagram of a modification of the invention;
FIGURE 16 is a schematic diagram of another modification of the invention;
FIGURE 17 is a schematic diagram illustrating how the auxiliary antennas may be adjusted in position; and
FIGURE 18 is a schematic diagram illustrating another arrangement for applying a correction signal to the navigation system.

Referring first to FIGURE 1, there is shown an aircraft 21 flying horizontally above the terrain 22. The aircraft 21 is equipped with a Doppler radar navigation system emitting a number of beams of microwave energy, one of which is shown at 23 making an angle $\gamma_0$ with the velocity vector 24 of the aircraft and striking the ground at the point P. The energy is scattered and a portion returns along the same path to the aircraft, undergoing a frequency change due to the aircraft motion. The change in frequency, $f_d$, that is, the difference between the transmitted and received frequencies, may be expressed as $$f_d = \frac{2V}{\lambda} \cos \gamma \qquad (1)$$

where V is the velocity of the aircraft with respect to the terrain, $\lambda$ is the wavelength of the microwave energy, and $\gamma$ is the angle between the velocity vector of the aircraft and the microwave beam, sometimes called the looking angle.

FIGURE 2 shows qualitatively the amount of energy back-scattered and received aboard the aircraft as a function of the looking angle, $\gamma$. The curve 26 represents scattering from typical ground areas such as farmland, forest, buildings, and the like. Although there is some increase at angles near 90°, the backscattered energy received is substantially constant over a wide range of angles. The curve 27 represents the energy received when flying over water as a function of looking angle. It is apparent that the amount of energy received decreases rapidly as the looking angle decreases from 90°. The amplitude and slope of the curve 27 depends upon the sea state, both being greatest for a calm sea.

Any physically realizable beam of microwave energy has substantial width and illuminates an area, rather than a point, on the ground. FIGURE 3 illustrates a beam illuminating an area represented by the cross-section from $P_1$ to $P_2$, where these points represent the 3 db or half power points of the beam. It is apparent that the looking angle for the point $P_1$ is greater than for the point $P_2$ and that, as shown by Equation 1, the frequency of the energy returned from Point $P_1$ is less than that returned from point $P_2$. However, if the aircraft is flying over land, the power returned from points $P_1$ to $P_2$ is substantially the same.

The backscattered microwave signal received is a broad, noiselike spectrum of frequencies, as is the actual Doppler signal which is derived therefrom, either by comparison with the transmitted frequency or, as more usual, by comparing the returns from two beams. Regardless of how the broad Doppler signal is extracted, the receiver is required to find its statistical center frequency. This it does by examining two narrow bands of frequencies slightly displaced from each other. Although usually accomplished by switching the frequency of a local oscillator, the effect is as if the signal were passed through two narrow bandpass filters, displaced in frequency from each other by about 10%, which are adjusted simultaneously upward or downward in frequency until the power passed by each is the same. The desired Doppler frequency is the mean of the two filter frequencies.

The effect of the two filters may be regarded as an examination of the return from two separate areas of the terrain, centered about the points $P_1$ and $P_2$ of FIGURE 3.

The curve 31 of FIGURE 4 represents the amount of power received as a function of frequency when flying over land. The transmitted beam is symmetrical, backscattering from land is substantially independent of looking angle, and the curve 31 is substantially gaussian in shape. The cross hatched areas 32 and 33 represent the power passed by the two filters when the receiver is locked on to the center frequency $f_r$. It is apparent that the filters pass equal amounts of power when adjusted to be equally above and below the center frequency, $f_r$.

Assume that the aircraft after flying over land long enough for the apparatus to lock on to the center frequency, $f_r$, as indicated in FIGURE 4, crosses the shore line and flies over the sea at the same speed. This situation is depicted in FIGURE 5. Because of the larger return at larger looking angles as shown by the curve 27 of FIGURE 2, the peak of the curve 34 is shifted to the left with respect to the former center frequency $f_r$. Accordingly the two filters now pass unequal amounts of power, as indicated by the cross hatched portions 35 and 36 in FIG. 5. The apparatus next adjusts the pass bands of the two filters until they pass equal amounts of power. This condition is depicted in FIGURE 6 where the cross hatched portions 37 and 38 show the new positions of the filters. The mean frequency is now $f_o$, which is displaced from the former mean frequency $f_r$. The result is that, although the aircraft speed remains unchanged, the apparatus indicates a different speed when flying over water than when flying over land. The present invention corrects such erroneous indications.

One of the principal difficulties is that of determining whether the surface beneath the aircraft has nonuniform scattering properties, and if so, the extent of the nonuniformity. Returning to FIGURE 3 for a moment, assume that the aircraft 21 is transmitting a narrow beam the center of which is at the angle $\gamma_o$ and which illuminates an area of the terrain centered at the point P but extending, with reduced power, to includes the points $P_1$ and $P_2$. If the terrain has uniform backscattering properties, the amount of power returned from points $P_1$ and $P_2$ is the same (although the frequencies are different). If the backscattering properties are nonuniform, the amounts of power returned are unequal. Therefore, the ratio of the amounts of power returned from points $P_1$ and $P_2$ is a measure of the nonuniformity of the backscattering properties of the terrain. The present invention measures this ratio by providing two auxiliary receiving antennas which receive energy backscattered from areas centered at points $P_1$ and $P_2$ respectively. If the ratio is unity, the backscattering properties are symmetrical and no correction is required. If the ratio is different from unity, the magnitude of the ratio is indicative of the amount of the correction which should be applied.

Referring now to FIGURE 7, there is shown schematically a linear array antenna 41 assumed to be mounted on an aircraft flying in the direction indicated by the arrow 42. The antenna transmits and receives microwave energy in four beams 43, 44, 45 and 46, which, in normal level flight, strike the ground in symmetrically related points. The forward beams 43 and 44 are directed at the same looking angle $\gamma_o$ while the rear beams 45 and 46 make an angle of $180°-\gamma_o$ with the velocity vector 42. The beams 43 and 44 lie on the same line of equal frequency shift or isodop 49 while the beams 45 and 46 lie on a similar isodop 50. Typically the beams 43 and 46 may be generated simultaneously and in alternation with the beams 44 and 45, each pair being generated for a period of about one half second each. The present invention includes two auxiliary antennas such as the slotted waveguide arrays 47 and 48, mounted on the same platform as the antenna array 41. The antenna 47 has a receiving pattern making an angle slightly less than $\gamma_o$ with the velocity vector while the antenna 48 has a pattern making an angle slightly greater than $\gamma_o$. Various specific patterns may be used, as illustrated in FIGURES 8, 9 and 10.

FIGURE 8 is a plan view showing the patterns 43 and 44 in dotted outline and the patterns 51 and 52 of the antennas 47 and 48 respectively in full outline. As shown, the patterns 51 and 52 straddle the pattern 44. All of the outlines represent the half power points of the respective patterns.

FIGURE 9 shows another arrangement in which the pattern 53 of the antenna 47 lies just ahead of the pattern 44, that is, the pattern 53 has a gamma angle less than that of the pattern 44 but is at substantially the same transverse position. The pattern 54 of the antenna 48 makes a slightly larger gamma angle than the pattern 43 but is at substantially the same transverse position.

FIGURE 10 shows another arrangement in which the pattern 55 of the antenna 47 makes a gamma angle slightly less than the patterns 43 and 44 but is very wide in the transverse direction so as to overlap both the patterns 43 and 44. The pattern 56 of the antenna 48 is also wide transversely so as to overlap both the pattern 43 and the pattern 44 but has a gamma angle greater than that of the patterns 43 and 44.

Referring now to FIGURE 11 there is shown a portion of a Doppler navigating system comprising a transmitter 61 and a receiver 62. The transmitter 61 is connected through a directional coupler 63 to a duplexer 64 and then to an antenna array 41 similar to that shown in FIGURE 7. The duplexer 64 is also connected to the receiver 62. A portion of the receiver pertinent for the present purposes is shown and includes a radio frequency section 65 which comprises a local oscillator, a modulator, an intermediate frequency amplifier and a detector. The section 65 delivers an output which is a spectrum of frequencies representing the Doppler shift in frequency, that is, the difference between the transmitted and received frequencies or, alternatively, the difference between the frequencies returned by a forward and an aft looking beam. This spectrum is similar in shape to the curve 34 shown in FIGURE 4. This spectrum is applied to a frequency tracker 66 which, in effect, passes the spectrum through two filters slightly displaced in frequency from each other which filters are adjusted in frequency simultaneously until both pass equal amounts of power. Typical frequency trackers are described in U.S. Patents Nos. 2,856,519, 2,870,331 and 2,896,074. The output of the frequency tracker 66 is the mean of the two filter frequencies and may be in the form of a rotating shaft the speed of which is proportional to frequency; or may be a D.C. voltage the magnitude of which is proportional to frequency; or may be an alternating voltage either the frequency or magnitude of which may be proportional to frequency. For present purposes it will be assumed that the output of the frequency tracker 66 is a shaft 67 the speed of rotation of which is proportional to the center of the Doppler spectrum. The shaft 67 is connected to a tachometer generator 68 which includes two windings 71 and 72. The winding 71 is connected to a source of alternating voltage of constant frequency and magnitude and the winding 72 has induced therein a voltage of the same frequency the magnitude of which is proportional to the speed of rotation of the shaft 67. The winding 72 is connected to a calibration circuit 73 in which the voltage may be adjusted to compensate for the particular characteristics of an individual antenna array 41. The circuit 73 is connected to an amplifier 74 which provides a low impedance output on the conductor 75 which is used to operate other apparatus such as indicators and/or computers.

The antennas 47 and 48 are mounted as shown in FIGURE 7 and in the present embodiment are arranged to have receiving patterns as shown at 53 and 54 of FIGURE 9. The antennas are preferably connected through a radio frequency switch 81 which is operated at a rate of 1 c.p.s. in synchronism with the alternate generation of the beams 43 and 44 of the main antenna. The common terminal of the switch 81 is connected to a crystal switch 82. A square wave generator 83 provides two outputs at a convenient frequency such as 400 c.p.s. which outputs are out of phase with each other and are identified in the drawing as having phase angles of 0° and 180° with respect to each other. The 0° output is connected to operate the crystal switch 82 so that radio frequency energy from the antennas 47 and 48 is passed through the switch 82 only on alternate half cycles of the 400 c.p.s. wave. The output of the switch 82 is connected to a modulator 84 which is also connected to a local oscillator 85. The oscillator 85 operates at a frequency which is displaced from that of the transmitter by a predetermined amount such as 30 mc.p.s. A portion of the energy from the transmitter 61 is sampled by the directional coupler 63 and applied to a modulator 86 which also receives energy from the oscillator 85. The modulator 86 generates the difference frequency which is applied to a 30 mc.p.s. discriminator 87 which in turn controls the frequency of the oscillator 85. The output of the modulator 84 is applied to an intermediate frequency amplifier 88.

A reference signal generator 91 is connected to two variable attenuators 92 and 93 which in turn are connected to opposite contacts of a switch 94 operated at the 1 c.p.s. switching rate of the antennas. The signal generator may, for example, comprise a noise generator but preferably comprises a sine wave oscillator generating an alternating current at the frequency of the I.F. amplifier 88 which in the present case is assumed to be 30 mc.p.s. The common terminal of the switch 94 is connected through a crystal switch 95 to the input of the I.F. amplifier 88. The switch 95 is controlled in conductivity by the 180° output of the square wave generator 83. Accordingly, the I.F. amplifier 88 receives, on alternate half cycles, the signal from the antennas 47 and 48 and a reference signal from the generator 91. The 400 cycle signal is recovered by a detector 96 and is filtered and amplified by a circuit 97 the output of which is applied to a switch 98 operated at the 1 c.p.s. antenna switching rate. The switch 98 applies the signal alternately to synchronous detectors 101 and 102. Considering first the operation with the switches in the position shown, the synchronous detector 101 is controlled by the 0° output of the square wave generator 83 and thereby generates a unidirectional output the polarity and magnitude of which are indicative of the sense and magnitude of the difference between the Doppler signal applied to the I.F. amplifier 88 and the reference signal applied thereto. This unidirectional signal controls a servo amplifier 103 which in turn controls a motor 104 which adjusts the attenuator 92. Adjustment continues until the output of the synchronous detector 101 is zero at which time the Doppler signal applied to the amplifier 88 is just balanced by a signal from the reference signal generator 91. With the switch 98 in the opposite position, the synchronous detector 102 is in operation and generates a similar signal which is applied to a servo amplifier 105 which in turn controls a motor 106 which adjusts the attenuator 93. Thus the adjusted position of the attenuator 93 as compared to that of the attenuator 92 is a measure of the difference in the amount of reference signal required to balance the signals received by the antennas 47 and 48. This difference in turn represents the imbalance in the power returned to the two antennas 47 and 48. The attenuators 92 and 93 and the motors 104 and 106 are connected to a mechanical differential 107 which thereby positions an output shaft 108 to an angular position indicative of the difference in power received by the antennas 47 and 48. The shaft 108 is connected to a converting circuit 109, such as a potentiometer, which generates a unidirectional voltage on a conductor 111 constituting a correction signal which is applied to the receiver 62 to correct the output on the conductor 75 to compensate for nonuniform backscattering.

The correction signal may be applied to the receiver in various ways, for example as shown in FIGURE 12. The output of the tachometer generator 68 depends not only on the speed of rotation of the shaft 67 but also on the magnitude of the excitation applied to the winding 71. A transformer 121 has its primary winding 122 connected in series with the source applied to the winding 71. The excitation is varied by varying the resistance reflected from the secondary winding 123 into the primary winding 122. The secondary winding 123 is connected to a full wave rectifier comprising diodes 124–127 which is loaded by a resistor 128 and also by the collector-emitter circuit of a transistor 129. Variation in the conductivity of the transistor 129 varies the load on the winding 123 and thus varies the resistance reflected to the winding 122. The correction signal from FIGURE 11 is applied between the base of a transistor 131 and common conductor 132. The collector of the transistor 131 is connected to a source of positive potential while the emitter is connected directly to the base of the transistor 129. A negative feedback circuit comprising serially connected resistors 133 and 134 is connected from the collector of the transistor 129 to the base of the transistor 131. A capacitor 135 is connected between the junction of the resistors 133 and 134 and the common conductor 132. It is apparent that variations in the magnitude of the correction signal will vary the conductivity of the transistor 131 which in turn varies the conductivity of the transistor 129 thereby varying the excitation applied to the winding 71 and the output of the tachometer 68.

The correction signal may also be applied as shown in FIGURE 13. The calibration circuit 73 is shown as comprising a potentiometer 141 connected in series with a resistor 142 with the combination connected across the winding 72. The slider of the potentiometer 141 is adjusted in order to calibrate the apparatus in accordance with the particular antenna array being used in the system. The potential of the slider of the potentiometer 141 and the potential of the correction signal are combined in an adding circuit 143 the output of which is applied to the amplifier 74. In this way the correction signal is applied directly to the output signal.

FIGURE 14 shows yet another way of applying the correction signal. A portion of the frequency tracker 66 is shown. As indicated by the cited patents, the frequency tracker always includes an integrator of one kind or another, the most common kind being a Miller feedback amplifier although it may in some cases take other forms. In any case the output of the integrator controls an alternating current source which may be an electronic oscillator or a motor driven tone wheel. The correction signal may be combined with the normal input to the integrator by means of an adding circuit 148 so that the speed of the tachometer generator 68 is modified directly by the correction signal.

Referring now to FIGURE 15 there is shown a modification of the invention. The reference signal generator 91, which is preferably a sine wave generator at the frequency of the intermediate frequency amplifier 88, is gated on and off by the 180° output of the square wave generator 83. Instead of two attenuators the generator 91 is connected to a single variable gain amplifier 151 the output of which is applied to the I.F. amplifier 88. The output of the filter and amplifier 97 is connected directly to a synchronous detector 152, the output of which is connected to an integrator 153 having a comparatively short time constant such as 0.1 second. The integrator in turn controls the gain of the amplifier 151. The output of the synchronous detector 152 is also connected alternately through a switch 154, operated at the 1 c.p.s. per second rate, to two integrators 155 and 156 having a comparatively long time constant such as five seconds. The outputs of these integrators are connected to a differential network 157 which derives a signal indicative of the difference between the outputs of the integrators 155 and 156 which output constitutes the correction signal.

Considering the operation when the switches 81 and 154 are in the position shown, the output of the synchronous detector 152 in general is not zero and operates through the integrator 153 to adjust the gain of the amplifier 151 to make the signals applied to the I.F. amplifier 88 equal. At the same time the output of the detector 152 is accumulated by the integrator 155 which thereby generates a signal representing the adjustment applied to the variable gain amplifier 151. When the switches 81 and 154 are reversed, the setting of the gain of the amplifier 151 is not in general correct and the output of the synchronous detector 152, operating through the integrator 153, readjusts the gain to make the signals applied to the I.F. amplifier 88 equal. At the same time the output of the detector 152 is applied to the integrator 156 which generates a signal indicative of the change in adjustment which has just been applied to the amplifier 151. After a number of cycles, the outputs of the integrators 155 and 156 represent the magnitude of the two adjustments applied successively to the amplifier 151 which in turn represents the two magnitudes from the generator 91 which is required to balance the signals from the antennas 47 and 48. The difference in the outputs of the integrators 155 and 156 thus represents the difference in the power received by the antennas 47 and 48 and constitutes a correction signal. This signal may be applied to the receiver 62 in any of the ways previously described.

FIGURE 16 illustrates another modification of the invention. The antennas 47 and 48 are designed to generate the patterns 51 and 52 illustrated in FIGURE 8. Since both receive energy reflected by the same transmitter beam it is not necessary that they be switched at the 1 c.p.s. rate. Instead, the I.F. amplifier 88 is gated off when the antennas are not viewing an illuminated area.

The antenna 47 is connected through a crystal switch 161 to an adding circuit 162. The antenna 48 is similarly connected through a crystal switch 163 to the adding circuit 162. The switches 161 and 163 are rendered conductive alternately by the two outputs of the generator 83. Thus the signals from the antennas 47 and 48 are applied on alternate half cycles of the 400 c.p.s. source to the modulator 84. After passing through the amplifier 88, the detector 96 and the filter and amplifier 97, the resulting signal is a 400 c.p.s. signal the phase and magnitude of which represents the difference in the power received by the antennas 47 and 48.

The antennas 47 and 48 are mounted to be physically movable as a unit so that the looking angle of both may be adjusted simultaneously. One suitable arrangement is shown schematically in FIGURE 17 in which one end of the linear array comprising antennas 47 and 48 is mounted on a pivot 166. The other end is adjusted upward or downward by the action of a cam 167 driven by a motor 168 which also adjusts a potentiometer 169. It is apparent that as the looking angle is adjusted the relative amounts of power received by the two antennas varies.

The output of the filter and amplifier 97 is connected to control the motor 168. This motor may be a two phase motor having one winding excited by a 400 c.p.s. source so that the output of the filter and amplifier 97 controls the direction and speed of rotation. The motor 168 in turn adjusts the position of the antennas 47 and 48 and also the slider of the potentiometer 169. A source of voltage may be connected across the potentiometer 169 so that the potential of the slider represents the correction signal. This signal may be applied to the receiver in any of the ways previously discussed.

FIGURE 18 illustrates another way in which the reference signal may be applied when using the modification shown in FIGURE 16. As shown in FIGURE 18, the potentiometer 169 is connected as a simple variable resistor in series with the excitation to the tachometer winding 71. Thus the motor 168, in adjusting the slider, directly varies the excitation to the winding 71.

Although a number of embodiments have been described for illustrative purposes many modifications will occur to those skilled in the art. It is therefore desired that the protection afforded by Letters Patent be limited only by the true scope of the appended claims.

What is claimed is:

1. In combination with an airborne Doppler radar navigation system including means for transmitting at least one beam of energy toward the surface of the earth making a fixed, same predetermined angle with the velocity vector of the aircraft and means positioned at the same angle as said transmitting means for receiving echoes backscattered from said surface, apparatus for determining the backscattering properties of said surface, comprising, first and second auxiliary antennas for receiving energy transmitted by said system and backscattered by a portion of the illuminated area of said surface, said first and second antennas receiving energy in beams making angles with said velocity vector which are respectively greater and less than said predetermined angle, and means connected to said auxiliary antennas for generating a signal indicative of the difference in the amount of power received by said first and second auxiliary antennas.

2. Apparatus for determining the backscattering properties of surfaces over which an aircraft is flying, comprising, an airborne Doppler navigation system including means for transmitting at least one narrow beam of energy for illuminating an area of the surface of the earth and for receiving energy backscattered from said area, the centerline of said beam making a predetermined angle with the velocity vector of said aircraft, whereby first and second portions of said area are illuminated by portions of said beam making angles with said velocity vector which are less and greater respectively than said predetermined angle, first and second auxiliary antennas for receiving energy transmitted by said system and backscattered from said area, said first and second auxiliary antennas being constructed for receiving energy primarily from said first and second portions of said area respectively, and means connected to said auxiliary antennas for generating a signal indicative of the difference in the amount of power received by said first and second auxiliary antennas.

3. In an airborne Doppler radar navigation system including a source of microwave energy applied to an antenna, which antenna generates two beams of microwave energy inclined to the ground, one beam directed to the right and the other to the left of the aircraft, both beams making the same predetermined acute angle with the velocity vector of said aircraft and which system also includes a receiver connected to said antenna for receiving echoes after reflection from the ground and for generating, from the frequency differences between the energy transmitted and the echoes received, an output signal proportional to the velocity vector of the aircraft, a calibration correcting apparatus, comprising, first and second auxiliary antennas for receiving auxiliary echoes from a different portion each, from the area so reflecting the beams, said first auxiliary antenna having a narrow receiving pattern making an angle with said velocity vector slightly greater than said predetermined acute angle, said second auxiliary antenna having a narrow receiving pattern making an angle with said velocity vector slightly less than said predetermined acute angle, means connected to said auxiliary antennas for generating an auxiliary signal indicative of the difference in the amount of energy received by said first and second auxiliary antennas, and means controlled by said auxiliary signal for modifying said output signal.

4. In combination with an airborne Doppler radar navigation system including means for transmitting at least two beams of energy toward the surface of the earth making a predetermined angle with the velocity vector of the aircraft and means for receiving echoes backscattered from said surface, apparatus for determining the backscattering properties of said surface comprising, first and second auxiliary antennas for receiving energy transmitted by said system and backscattered by said surface, said first and second antennas receiving energy in beam directions making angles with said velocity vector which are respectively slightly greater and slightly less than said predetermined angle, a reference signal generator, a first comparison circuit means for comparing the amplitude of the reference signal generator output with the amplitude of the signal received by said first antenna and producing from said comparison a first manifestation which is proportional to the amplitude of the signal received by said first antenna, a second comparison circuit means for comparing the amplitude of the reference signal generator output with the amplitude of the signal received by said second antenna and producing from said second comparison a second manifestation which is proportional to the amplitude of the signal received by said second antenna, and means for deriving a correction signal from said first and second manifestations.

5. In combination with an airborne Doppler radar navigation system including means for transmitting at least two beams of energy toward the surface of the earth making a predetermined angle with the velocity vector of the aircraft and means for receiving echoes backscattered from said surface, apparatus for determining the backscattering properties of said surface comprising, first and second auxiliary antennas for receiving energy transmitted by said system and backscattered by said surface, said first and second antennas receiving energy in beam directions making angles with said velocity vector which are respectively slightly greater and slightly less than said predetermined angle, a reference signal generator, synchronous detector means, means for alternately applying the signal received by said first antenna and the output of said reference signal generator to said synchronous detector means during a first time interval for producing a first synchronous detector output signal indicative of the magnitude of the signal received by said first antenna, means for alternately applying the signal received by said second antenna and the output of said reference signal generator to said synchronous detector means during a second time interval for producing a second synchronous detector output signal indicative of the magnitude of the signal received by said second antenna, and means for deriving a correction signal from the difference of said first and second synchronous detector output signals.

6. In combination with an airborne Doppler radar navigation system including means for transmitting at least two beams of energy toward the surface of the earth making a predetermined angle with the velocity vector of the aircraft and means for receiving echoes backscattered from said surface, apparatus for determining the backscattering properties of said surface comprising, first and second auxiliary antennas for receiving energy transmitted by said system and backscattered by said surface, said first and second antennas receiving energy in beam directions making angles with said velocity vector which are respectively slightly greater and slightly less than said predetermined angle, a reference signal generator, a first synchronous detector, means for alternately applying the signal received by said first antenna and the output of said reference signal generator to the input of said first synchronous detector during a first interval of time, the output of said reference signal generator being applied to the input of said first synchronous detector through first signal amplitude adjusting means which is operated by the output of said first synchronous detector to cause the reference signal generator input to said first synchronous detector to be equal to the signal applied thereto by the signal received by said first antenna, a second synchronous detector, means for alternately applying the signal received by said second antenna and the output of said reference signal generator to the input of said second synchronous detector during a second interval of time, the output of said reference signal generator being applied to the input of said second synchronous detector through second signal amplitude adjusting means which is operated by the output of said second synchronous detector to cause the reference signal generator input to said second synchronous detector to be equal to the signal applied thereto by the signal received by said second antenna, and means for deriving a correction signal from the relative adjustment of said first and second signal amplitude adjusting means.

7. Apparatus as set forth in claim 6 in which said first and second signal amplitude adjusting means are potentiometers.

8. In combination with an airborne Doppler radar navigation system including means for transmitting at least two beams of energy toward the surface of the earth making a predetermined angle with the velocity vector of the aircraft and means for receiving echoes backscattered from said surface, apparatus for determining the backscattering properties of said surface comprising, first and second auxiliary antennas for receiving energy transmitted by said system and backscattered by said surface, said first and second antennas receiving energy in beam directions making angles with said velocity vector which are respectively slightly greater and slightly less than said predetermined angle, a reference signal generator, a synchronous detector, means for alternately applying the signal received by said first antenna and the output of said reference signal generator to the input of said synchronous detector during a first interval of time, means for alternately applying the signal received by said second antenna and the output of said reference signal generator to the input of said synchronous detector during a second interval of time, the output of said reference signal generator being applied to the input of said synchronous detector through a variable gain amplifier, the gain of which is controlled by the output of the synchronous detector impressed on said amplifier through an integrator having a short time constant, a pair of long time constant integrators having the output of said synchronous detector impressed on one of said integrators during said first interval of time and on the other of said integrators during said second time interval, and means for deriving a correction signal from the difference of the outputs of said pair of long time integrators.

9. In combination with an airborne Doppler radar navigation system including means for transmitting at least two beams of energy toward the surface of the earth making a predetermined angle with the velocity vector of the aircraft and means for receiving echoes backscattered from said surface, apparatus for determining the backscattering properties of said surface comprising, first and second auxiliary antennas for receiving energy transmitted by said system and backscattered by said surface, said first and second antennas receiving energy in beam directions making different angles with said velocity vector, a reference signal generator, said first and second antennas being mounted for simultaneous rotation about a common axis, means for generating a square wave, means for comparing the amplitudes of signals received by said first and second antennas during successive half cycles of said square wave, means operated by a signal produced by said comparison for rotating said first and second antennas until the amplitudes received thereby are equal, and means for producing a correction signal the magnitude of which is determined by the amount of rotation of said first and second antennas.

References Cited by the Examiner

UNITED STATES PATENTS

| | | | |
|---|---|---|---|
| 3,023,407 | 2/1962 | Basim | 343—9 |
| 3,044,059 | 7/1962 | Belchis | 343—8 |
| 3,072,900 | 1/1963 | Beck | 343—8 |
| 3,077,594 | 2/1963 | McKay | 343—8 |
| 3,159,834 | 12/1964 | Fiocco | 343—9 |

CHESTER L. JUSTUS, *Primary Examiner.*

LEWIS H. MYERS, *Examiner.*